United States Patent
Schmidt et al.

(10) Patent No.: US 9,701,790 B2
(45) Date of Patent: Jul. 11, 2017

(54) METHOD FOR PRODUCING ALIPHATIC OR PARTIALLY AROMATIC POLYAMIDES, SAID METHOD COMPRISING A SOLID-PHASE POLYMERIZATION PROCESS

(71) Applicant: BASF SE, Ludwigshafen (DE)

(72) Inventors: Christian Schmidt, Ludwigshafen (DE); Florian Richter, Mannheim (DE); Joachim Clauss, Darmstadt (DE); Axel Wilms, Frankenthal (DE); Gad Kory, Gaiberg (DE); Arnold Schneller, Seeheim-Jugenheim (DE); Achim Stammer, Freinsheim (DE); Volker Rauschenberger, Eisenberg (DE); Stefan Schwiegk, Neustadt (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/896,456

(22) PCT Filed: Jun. 11, 2014

(86) PCT No.: PCT/EP2014/062124
§ 371 (c)(1),
(2) Date: Dec. 7, 2015

(87) PCT Pub. No.: WO2014/198770
PCT Pub. Date: Dec. 18, 2014

(65) Prior Publication Data
US 2016/0137783 A1    May 19, 2016

(30) Foreign Application Priority Data
Jun. 12, 2013  (EP) ..................... 13171646

(51) Int. Cl.
C08G 69/26  (2006.01)
C08G 69/30  (2006.01)
C08G 69/46  (2006.01)
C08L 77/04  (2006.01)

(52) U.S. Cl.
CPC ............. *C08G 69/30* (2013.01); *C08G 69/26* (2013.01); *C08G 69/46* (2013.01); *C08L 77/04* (2013.01)

(58) Field of Classification Search
None
See application file for complete search history.

(56) References Cited

U.S. PATENT DOCUMENTS

| | | |
|---|---|---|
| 4,019,866 A | 4/1977 | Jaswal et al. |
| 5,418,068 A | 5/1995 | Caluori et al. |
| 5,708,125 A | 1/1998 | Liedloff et al. |
| 6,136,947 A | 10/2000 | Wiltzer et al. |
| 2011/0092645 A1 | 4/2011 | Loth et al. |
| 2012/0065339 A1* | 3/2012 | Grutzner ................ C08G 69/48 525/420 |

FOREIGN PATENT DOCUMENTS

| | | |
|---|---|---|
| CA | 2153862 A1 | 1/1996 |
| CN | 1207746 A | 2/1999 |
| CN | 101463130 A | 6/2009 |
| CN | 102066463 A | 5/2011 |
| CN | 103080189 A | 5/2013 |
| DE | 43 29 676 A1 | 3/1994 |
| EP | 0 123 377 A2 | 10/1984 |
| EP | 0 976 774 A2 | 2/2000 |
| WO | WO-02/28941 A2 | 4/2002 |
| WO | WO-2004/055084 A2 | 7/2004 |

OTHER PUBLICATIONS

Alewelt, W., et al., "Industrial Thermoplastics: Polyamide," *Plastics Handbook*, 3/4, Carl Hanser Publishing Company, 1998, Munich, pp. 42-71.

* cited by examiner

*Primary Examiner* — Ana Woodward
(74) *Attorney, Agent, or Firm* — Marshall, Gerstein & Borun LLP

(57) ABSTRACT

The present invention relates to a process for preparing an aliphatic or semiaromatic polyamide, in which a polyamide prepolymer is subjected to a solid state polymerization.

14 Claims, No Drawings

METHOD FOR PRODUCING ALIPHATIC OR PARTIALLY AROMATIC POLYAMIDES, SAID METHOD COMPRISING A SOLID-PHASE POLYMERIZATION PROCESS

CROSS-REFERENCE TO RELATED APPLICATIONS

This is the U.S. national phase of International Application No. PCT/EP2014/062124, filed Jun. 11, 2014, which claims the benefit of European Patent application No. 13171646.6, filed Jun. 12, 2013.

BACKGROUND OF THE INVENTION

The present invention relates to a process for preparing an aliphatic or semiaromatic polyamide, in which a polyamide prepolymer is subjected to a solid state polymerization.

STATE OF THE ART

Polyamides are one of the polymers produced on a large scale globally and, in addition to the main fields of use in films, fibers and materials, serve for a multitude of further end uses. Among the polyamides, polyamide-6 (polycaprolactam) and polyamide-6,6 (Nylon, polyhexamethyleneadipamide) are the polymers prepared in the largest volumes. Polyamide-6,6 is prepared predominantly by polycondensation of what are called AH salt solutions, i.e. of aqueous solutions comprising adipic acid and 1,6-diaminohexane (hexamethylenediamine) in stoichiometric amounts. The conventional process for preparing polyamide-6 is the hydrolytic ring-opening polymerization of ε-caprolactam, which is still of very great industrial significance. Conventional preparation processes for polyamide-6 and polyamide-6,6 are described, for example, in Kunststoffhandbuch, 3/4 Technische Thermoplaste: Polyamide [Plastics Handbook, 3/4 Industrial Thermoplastics: Polyamides], Carl Hanser Verlag, 1998, Munich, p. 42-71.

A further important group of polyamides is that of semicrystalline or amorphous thermoplastic semiaromatic polyamides, which have found a wide range of use as important industrial plastics. They are especially notable for their high thermal stability and are also referred to as high-temperature polyamides (HTPA). An important field of use of the HTPAs is the production of electrical and electronic components, and suitable polymers for use in soldering operations under lead-free conditions (lead free soldering) are especially those based on polyphthalamide (PPA). HTPAs serve, inter alia, for production of plug connectors, microswitches and -buttons and semiconductor components, such as reflector housings of light-emitting diodes (LEDs). A further important field of use of the HTPAs is in high-temperature automotive applications. Important properties here are good heat aging resistance, and high strength and toughness and weld seam strength of the polymers used. Amorphous HTPAs or those having very low crystalline contents are transparent and are especially suitable for applications where transparency is advantageous. Semicrystalline HTPAs are generally notable for long-term stability at high ambient temperature and are suitable, for example, for applications in the engine bay area.

The preparation of semiaromatic polyamides generally begins with the formation of an aqueous salt solution from at least one diamine and at least one dicarboxylic acid, and optionally further monomer components, such as lactams, co-amino acids, monoamines, monocarboxylic acids and mixtures thereof, with the proviso that at least one of the components has an aromatic group. The formation of the salt solution is then generally followed by an oligomerization in the liquid phase, during which there is generally still no removal of water. At the end of this oligomerization, the oligomers have an average, for example, of 4 to 10 repeat units. To increase the molecular weight further, two alternative routes are then available. In the first variant, the oligomer formed is converted by dewatering to the solid phase and subjected to what is called a solid state polymerization (SSP). In the second variant, water is removed in a controlled manner and the temperature is increased to convert the aqueous solution to the melt for further polycondensation. At the end of the polymerization in the melt or in the solid phase, a prepolymer having a number-average molecular weight of about 500 to 12000 g/mol is obtained.

EP 0 693 515 A1 describes a process for preparing precondensates of semicrystalline or amorphous, thermoplastically processable semiaromatic polyamides in a multistage batchwise operation comprising the following stages a) to e):

a) a salt formation phase for preparation of salt(s) from diamine(s) and dicarboxylic acid(s) and optionally partial prereaction to give low molecular weight oligoamides at temperatures between 120° C. and 220° C. and pressures of up to 23 bar, b) optionally the transfer of the solution from stage a) into a second reaction vessel or a stirred autoclave under the conditions which exist at the end of preparation thereof, c) the reaction phase, during which the conversion to the precondensates is promoted, through heating of the reactor contents to a given temperature and controlled adjustment of the partial steam pressure to a given value which is maintained by controlled release of steam or optionally controlled introduction of steam from a steam generator connected to the autoclave, d) a steady-state phase which has to be maintained for at least 10 minutes, in the course of which the temperature of the reactor contents and the partial steam pressure are each set to the values envisaged for the transfer of the precondensates into the downstream process stage, where the temperature of the reactor contents during phases c) and d) must not exceed 265° C. in the case of precondensates of semicrystalline (co)polyamides having a melting point of more than 280° C., and particular, more accurately defined boundary conditions in relation to the dependence of the minimum partial steam pressure $PH_2O$ (minimum) to be employed on the temperature of the reactor contents and the amide group concentration of the polymer have to be complied with for said semicrystalline (co)polyamides during phases c) and d), and e) a discharge phase, during which the precondensates can be supplied to a final reaction apparatus either directly in the molten state or after passing through the solid state and optionally further process stages.

To obtain the high molecular weight desired, the prepolymer is generally subjected to a postcondensation. In respect of this postcondensation, EP 0 693 515 A1 does not comprise any specific details. Only in the acknowledgement of the prior art is the possibility of postcondensation in a continuous extruder mentioned.

DE 41 42 978 describes a multilayer composite system for reusable packaging materials composed of at least one copolyamide protective layer and at least one copolyamide barrier layer, wherein the copolyamides used are prepared batchwise. According to the working examples, the copolyamides are prepared in the melt in a pressure autoclave with nitrogen sparging. There is no description of a postcondensation in the solid phase.

WO 2004/055084 describes semicrystalline, thermoplastically processable, semiaromatic copolyamides preparable by condensation of at least the following monomers or precondensates thereof: a) terephthalic acid, b) at least one dimerized fatty acid having up to 44 carbon atoms and c) at least one aliphatic diamine of the formula $H_2N-(CH_2)_x-NH_2$ in which x is an integer of 4-18. For preparation of the copolyamides, there is merely a general reference to known processes. In the working examples, a precondensate is subjected to a postcondensation in the melt in an autoclave. There is no disclosure of the use of inert gas during the postcondensation.

US 2003/0176624 A1 describes a process for solid phase drying or solid phase polymerization of a polyamide based on xylylenediamine. This solid phase polymerization takes place in an inert gas stream or under reduced pressure.

WO 2007/048728 describes polyamides formed from m-xylylenediamine and adipic acid having an amino end group content of less than 15 mmol/kg. A prepolymer is first prepared, which can optionally be subjected to an extraction and a solid phase condensation. The solid phase condensation can be effected either under reduced pressure or under inert gas.

It is an object of the present invention to provide an improved process for preparing aliphatic or semiaromatic polyamides. These are to feature advantageous product properties, more particularly not too broad a molecular weight distribution and/or a low gel content.

It has been found that, surprisingly, this object is achieved when a prepolymer of an aliphatic or aromatic polyamide is subjected to a solid state polymerization in a closed vessel at elevated pressure and in the presence of an inert gas. This is especially surprising since no discharge of components, specifically of water, from the interior of the vessel into the environment is possible during the solid state polymerization.

SUMMARY OF THE INVENTION

The invention firstly provides a process for preparing an aliphatic or semiaromatic polyamide, in which
a) a prepolymer of the aliphatic or semiaromatic polyamide is provided,
b) the prepolymer provided in step a) is subjected to a solid state polymerization in a closed vessel at elevated temperature and elevated pressure in the presence of a gas which is inert under the treatment conditions.

The invention further provides an aliphatic or semiaromatic polyamide obtainable by a process as defined above and hereinafter.

The invention further provides a polyamide molding composition comprising at least one polyamide, obtainable by a process as defined above and hereinafter. The invention further provides a molding produced from such a polyamide molding composition.

The invention further provides for the use of an aliphatic polyamide obtainable by a process as defined above and hereinafter for production of films, monofilaments, fibers, yarns or textile fabrics.

The invention further provides for the use of a semiaromatic polyamide obtainable by a process as defined above and hereinafter, preferably for production of electrical and electronic components and for high-temperature automotive applications.

DESCRIPTION OF THE INVENTION

A "solid state polymerization" is generally understood to mean a condensation reaction to increase the molecular weight within a temperature range above the glass transition temperature and below the melting temperature of the polyamide. Within this temperature range, unwanted thermal degradation of the polyamide can substantially be avoided.

A "solid state polymerization in a closed vessel" is understood to mean that no mass transfer between the interior of the vessel and the environment takes place after the polymerization temperature has been attained. More particularly, no gas stream is passed through the vessel during the solid state polymerization. Thus, during the solid state polymerization, there is no discharge of components, for example of water, from the interior of the vessel into the environment. Exchange of heat between the interior of the vessel and the environment is, in contrast, permitted in the invention solid state polymerization in a closed vessel.

A prepolymer in the context of the invention refers to a composition comprising polymeric compounds having complementary functional groups capable of a condensation reaction to increase the molecular weight.

The condensation of the monomers of the acid component and of the diamine component, and also of any lactam component used, forms repeat units or end groups in the form of amides derived from the respective monomers. These monomers generally account for 95 mol %, especially 99 mol %, of all the repeat units and end groups present in the copolyamide. In addition, the copolyamide may also comprise small amounts of other repeat units which may result from degradation reactions or side reactions of the monomers, for example of the diamines.

The polyamides are designated in the context of the invention using abbreviations, some of which are customary in the art, which consist of the letters PA followed by numbers and letters. Some of these abbreviations are standardized in DIN EN ISO 1043-1. Polyamides which can be derived from aminocarboxylic acids of the $H_2N-(CH_2)_x-COOH$ type or the corresponding lactams are identified as PA Z where Z denotes the number of carbon atoms in the monomer. For example, PA 6 represents the polymer of ε-caprolactam or of ω-aminocaproic acid. Polyamides which derive from diamines and dicarboxylic acids of the $H_2N-(CH_2)_x-NH_2$ and $HOOC-(CH_2)_y-COOH$ types are identified as PA Z1Z2 where Z1 denotes the number of carbon atoms in the diamine and Z2 the number of carbon atoms in the dicarboxylic acid. Copolyamides are designated by listing the components in the sequence of their proportions, separated by slashes. For example, PA 66/610 is the copolyamide of hexamethylenediamine, adipic acid and sebacic acid. For the monomers having an aromatic or cycloaliphatic group which are used in accordance with the invention, the following letter abbreviations are used:

T=terephthalic acid, I=isophthalic acid, MXDA=m-xylylenediamine, IPDA=isophoronediamine, PACM=4,4'-methylenebis(cyclohexylamine), MACM=2,2'-dimethyl-4,4'-methylenebis(cyclohexylamine).

Hereinafter, the expression "$C_1$-$C_4$-alkyl" comprises unsubstituted straight-chain and branched $C_1$-$C_4$-alkyl groups. Examples of $C_1$-$C_4$-alkyl groups are especially methyl, ethyl, propyl, isopropyl, n-butyl, isobutyl, sec-butyl, tert-butyl(1,1-dimethylethyl).

In the aromatic dicarboxylic acids, aliphatic dicarboxylic acids, cycloaliphatic dicarboxylic acids and monocarboxylic acids mentioned hereinafter, the carboxyl groups may each be present in underivatized form or in the form of derivatives. In the case of dicarboxylic acids, neither carboxyl group, one carboxyl group or both carboxyl groups may be in the form of a derivative. Suitable derivatives are anhydrides, esters, acid chlorides, nitriles and isocyanates. Preferred derivatives are anhydrides or esters. Anhydrides of dicarboxylic acids may be in monomeric or in polymeric form. Preferred esters are alkyl esters and vinyl esters, more preferably $C_1$-$C_4$-alkyl esters, especially the methyl esters or ethyl esters. Dicarboxylic acids are preferably in the form of mono- or dialkyl esters, more preferably mono- or di-$C_1$-$C_4$-alkyl esters, more preferably monomethyl esters, dimethyl esters, monoethyl esters or diethyl esters. Dicarboxylic acids are additionally preferably in the form of mono- or divinyl esters. Dicarboxylic acids are additionally preferably in the form of mixed esters, more preferably mixed esters with different $C_1$-$C_4$-alkyl components, especially methyl ethyl esters.

The prepolymer is provided by polycondensation of an aqueous composition comprising at least one component suitable for polyamide formation.

Preferably, the prepolymer (and accordingly the aliphatic or semiaromatic polyamide) comprises incorporated components selected from A) unsubstituted or substituted aromatic dicarboxylic acids and derivatives of unsubstituted or substituted aromatic dicarboxylic acids,
B) unsubstituted or substituted aromatic diamines,
C) aliphatic or cycloaliphatic dicarboxylic acids and derivatives thereof,
D) aliphatic or cycloaliphatic diamines,
E) monocarboxylic acids and derivatives thereof,
F) monoamines,
G) at least trifunctional amines,
H) lactams,
I) ω-amino acids,
K) compounds which are different than A) to I) and are cocondensable therewith.

A suitable embodiment is aliphatic polyamides. For aliphatic polyamides of the PA Z1 Z2 type (such as PA 66), the proviso applies that at least one of components C) and D) must be present and neither of components A) and B) may be present. For aliphatic polyamides of the PA Z type (such as PA 6 or PA 12), the proviso applies that at least component H) must be present.

A preferred embodiment is semiaromatic polyamides. For semiaromatic polyamides, the proviso applies that at least one of components A) and B) and at least one of components C) and D) must be present.

The aromatic dicarboxylic acids A) are preferably selected from in each case unsubstituted or substituted phthalic acid, terephthalic acid, isophthalic acid, naphthalenedicarboxylic acids or diphenyldicarboxylic acids, and the derivatives and mixtures of the aforementioned aromatic dicarboxylic acids.

Substituted aromatic dicarboxylic acids A) preferably have at least one (e.g. 1, 2, 3 or 4) $C_1$-$C_4$-alkyl radical. More particularly, substituted aromatic dicarboxylic acids A) have 1 or 2 $C_1$-$C_4$-alkyl radicals. These are preferably selected from methyl, ethyl, n-propyl, isopropyl, n-butyl, isobutyl, sec-butyl and tert-butyl, more preferably methyl, ethyl and n-butyl, particularly methyl and ethyl and especially methyl. Substituted aromatic dicarboxylic acids A) may also bear further functional groups which do not disrupt the amidation, for example 5-sulfoisophthalic acid, and salts and derivatives thereof. A preferred example thereof is the sodium salt of dimethyl 5-sulfoisophthalate.

Preferably, the aromatic dicarboxylic acid A) is selected from unsubstituted terephthalic acid, unsubstituted isophthalic acid, unsubstituted naphthalenedicarboxylic acids, 2-chloroterephthalic acid, 2-methylterephthalic acid, 5-methylisophthalic acid and 5-sulfoisophthalic acid.

More preferably, the aromatic dicarboxylic acid A) used is terephthalic acid, isophthalic acid or a mixture of terephthalic acid and isophthalic acid.

Preferably, the semiaromatic polyamide prepolymers provided in accordance with the invention have a proportion of aromatic dicarboxylic acids among all the dicarboxylic acids of at least 50 mol %, more preferably of 70 mol % to 100 mol %. In a specific embodiment, the semiaromatic polyamides prepared by the process according to the invention (and the prepolymers provided in step a)) have a proportion of terephthalic acid or isophthalic acid or a mixture of terephthalic acid and isophthalic acid, based on all the dicarboxylic acids, of at least 50 mol %, preferably of 70 mol % to 100 mol %.

The aromatic diamines B) are preferably selected from bis(4-aminophenyl)methane, 3-methylbenzidine, 2,2-bis(4-aminophenyl)propane, 1,1-bis(4-aminophenyl)cyclohexane, 1,2-diaminobenzene, 1,4-diaminobenzene, 1,4-diaminonaphthalene, 1,5-diaminonaphthalene, 1,3-diaminotoluene(s), m-xylylenediamine, N,N'-dimethyl-4,4'-biphenyldiamine, bis(4-methylaminophenyl)methane, 2,2-bis(4-methylaminophenyl)propane or mixtures thereof.

The aliphatic or cycloaliphatic dicarboxylic acids C) are preferably selected from oxalic acid, malonic acid, succinic acid, glutaric acid, adipic acid, pimelic acid, suberic acid, azelaic acid, sebacic acid, undecane-α,ω-dicarboxylic acid, dodecane-α,ω-dicarboxylic acid, maleic acid, fumaric acid or itaconic acid, cis- and trans-cyclohexane-1,2-dicarboxylic acid, cis- and trans-cyclohexane-1,3-dicarboxylic acid, cis- and trans-cyclohexane-1,4-dicarboxylic acid, cis- and trans-cyclopentane-1,2-dicarboxylic acid, cis- and trans-cyclopentane-1,3-dicarboxylic acid and mixtures thereof.

The aliphatic or cycloaliphatic diamines D) are preferably selected from ethylenediamine, propylenediamine, tetramethylenediamine, heptamethylenediamine, hexamethylenediamine, pentamethylenediamine, octamethylenediamine, nonamethylenediamine, 2-methyl-1,8-octamethylenediamine, decamethylenediamine, undecamethylenediamine, dodecamethylenediamine, 2-methylpentamethylenediamine, 2,2,4-trimethylhexamethylenediamine, 2,4,4-trimethylhexamethylenediamine, 5-methylnonamethylenediamine, 2,4-dimethyloctamethylenediamine, 5-methylnonanediamine, bis(4-aminocyclohexyl)methane, 3,3'-dimethyl-4,4'-diaminodicyclohexylmethane and mixtures thereof.

More preferably, the diamine D) is selected from hexamethylenediamine, 2-methylpentamethylenediamine, octamethylenediamine, nonamethylenediamine, decamethylenediamine, undecamethylenediamine, dodecamethylenediamine, bis(4-aminocyclohexyl)methane, 3,3'-dimethyl-4,4'-diaminodicyclohexylmethane and mixtures thereof.

In a specific implementation, the semiaromatic polyamides comprise at least one copolymerized diamine D) selected from hexamethylenediamine, bis(4-aminocyclohexyl)methane (PACM), 3,3'-dimethyl-4,4'-diaminodicyclohexylmethane (MACM), isophoronediamine (IPDA) and mixtures thereof.

In a specific implementation, the semiaromatic polyamides comprise exclusively hexamethylenediamine as the copolymerized diamine D).

In a further specific implementation, the semiaromatic polyamides comprise exclusively bis(4-aminocyclohexyl) methane as the copolymerized diamine D).

In a further specific implementation, the semiaromatic polyamides comprise exclusively 3,3'-dimethyl-4,4'-diaminodicyclohexylmethane (MACM) as the copolymerized diamine D).

In a further specific implementation, the semiaromatic polyamides comprise exclusively isophoronediamine (IPDA) as the copolymerized diamine D).

The prepolymers (and correspondingly the aliphatic and the semiaromatic polyamides) may comprise at least one copolymerized monocarboxylic acid E). The monocarboxylic acids E) serve to end-cap the polyamides prepared in accordance with the invention. Suitable monocarboxylic acids are in principle all of those capable of reacting with at least some of the amino groups available under the reaction conditions of the polyamide condensation. Suitable monocarboxylic acids E) are aliphatic monocarboxylic acids, alicyclic monocarboxylic acids and aromatic monocarboxylic acids. These include acetic acid, propionic acid, n-, iso- or tert-butyric acid, valeric acid, trimethylacetic acid, caproic acid, enanthic acid, caprylic acid, pelargonic acid, capric acid, undecanoic acid, lauric acid, tridecanoic acid, myristic acid, palmitic acid, stearic acid, pivalic acid, cyclohexanecarboxylic acid, benzoic acid, methylbenzoic acids, α-naphthalenecarboxylic acid, β-naphthalenecarboxylic acid, phenylacetic acid, oleic acid, ricinoleic acid, linoleic acid, linolenic acid, erucic acid, fatty acids from soya, linseeds, castor oil plants and sunflowers, acrylic acid, methacrylic acid, Versatic® acids, Koch® acids and mixtures thereof.

If the monocarboxylic acids E) used are unsaturated carboxylic acids or derivatives thereof, it may be advisable to work in the presence of commercial polymerization inhibitors.

More preferably, the monocarboxylic acid E) is selected from acetic acid, propionic acid, benzoic acid and mixtures thereof.

In a specific implementation, the prepolymers (and correspondingly the aliphatic and the semiaromatic polyamides) comprise exclusively propionic acid as the copolymerized monocarboxylic acid E).

In a further specific implementation, the prepolymers (and correspondingly the aliphatic and the semiaromatic polyamides) comprise exclusively benzoic acid as the copolymerized monocarboxylic acid E).

In a further specific implementation, the prepolymers (and correspondingly the aliphatic and the semiaromatic polyamides) comprise exclusively acetic acid as the copolymerized monocarboxylic acid E).

The prepolymers (and correspondingly the aliphatic and the semiaromatic polyamides) may comprise at least one copolymerized monoamine F). In this context, the aliphatic polyamides comprise only copolymerized aliphatic monoamines or alicyclic monoamines. The monoamines F) serve to end-cap the polyamides prepared in accordance with the invention. Suitable monoamines are in principle all of those capable of reacting with at least some of the carboxylic acid groups available under the reaction conditions of the polyamide condensation. Suitable monoamines F) are aliphatic monoamines, alicyclic monoamines and aromatic monoamines. These include methylamine, ethylamine, propylamine, butylamine, hexylamine, heptylamine, octylamine, decylamine, stearylamine, dimethylamine, diethylamine, dipropylamine, dibutylamine, cyclohexylamine, dicyclohexylamine, aniline, toluidine, diphenylamine, naphthylamine and mixtures thereof.

For preparation of the prepolymers (and correspondingly of the aliphatic and the semiaromatic polyamides), it is additionally possible to use at least one at least trifunctional amine G). These include N'-(6-aminohexyl)hexane-1,6-diamine, N'-(12-aminododecyl)dodecane-1,12-diamine, N'-(6-aminohexyl)dodecane-1,12-diamine, N'-[3-(aminomethyl)-3,5,5-trimethylcyclohexyl]hexane-1,6-diamine, N'-[3-(aminomethyl)-3,5,5-trimethylcyclohexyl]dodecane-1,12-diamine, N'-[(5-amino-1,3,3-trimethylcyclohexyl)methyl]hexane-1,6-diamine, N'-[(5-amino-1,3,3-trimethylcyclohexyl)methyl]dodecane-1,12-diamine, 3-[[[3-(aminomethyl)-3,5,5-trimethylcyclohexyl]amino]methyl]-3,5,5-trimethylcyclohexanamine, 3-[[(5-amino-1,3,3-trimethylcyclohexyl)methylamino]methyl]-3,5,5-trimethylcyclohexanamine, 3-(aminomethyl)-N-[3-(aminomethyl)-3,5,5-trimethylcyclohexyl]-3,5,5-trimethylcyclohexanamine. Preferably, no at least trifunctional amines G) are used.

Suitable lactams H) are ε-caprolactam, 2-piperidone (δ-valerolactam), 2-pyrrolidone (γ-butyrolactam), capryllactam, enantholactam, lauryllactam and mixtures thereof.

Suitable ω-amino acids I) are 6-aminocaproic acid, 7-aminoheptanoic acid, 11-aminoundecanoic acid, 12-aminododecanoic acid and mixtures thereof.

Suitable compounds K) which are different than A) to I) and are cocondensable therewith are at least tribasic carboxylic acids, diaminocarboxylic acids, etc.

Suitable compounds K) are additionally 4-[(Z)—N-(6-aminohexyl)-C-hydroxycarbonimidoyl]benzoic acid, 3-[(Z)—N-(6-aminohexyl)-C-hydroxycarbonimidoyl]benzoic acid, (6Z)-6-(6-aminohexylimino)-6-hydroxyhexanecarboxylic acid, 4-[(Z)—N-[(5-amino-1,3,3-trimethylcyclohexyl)methyl]-C-hydroxycarbonimidoyl]benzoic acid, 3-[(Z)—N-[(5-amino-1,3,3-trimethylcyclohexyl)methyl]-C-hydroxycarbonimidoyl]benzoic acid, 4-[(Z)—N-[3-(aminomethyl)-3,5,5-trimethylcyclohexyl]-C-hydroxycarbonimidoyl]benzoic acid, 3-[(Z)—N-[3-(aminomethyl)-3,5,5-trimethylcyclohexyl]-C-hydroxycarbonimidoyl]benzoic acid and mixtures thereof.

In a preferred embodiment, the process according to the invention serves for preparation of an aliphatic polyamide.

In that case, the polyamide is preferably selected from PA 6, PA 11, PA 12, PA 46, PA 66, PA 666, PA 69, PA 610, PA 612, PA 96, PA 99, PA 910, PA 912, PA 1212, and copolymers and mixtures thereof.

More particularly, the aliphatic polyamide is PA 6, PA 66 or PA 666, most preferably PA 6.

In a further preferred embodiment, the process according to the invention serves for preparation of a semiaromatic polyamide.

In that case, the polyamide is preferably selected from PA 6.T, PA 9.T, PA 8.T, PA 10.T, PA 12.T, PA 6.I, PA 8.I, PA 9.I, PA 10.I, PA 12.I, PA 6.T/6, PA 6.T/10, PA 6.T/12, PA 6.T/6.I, PA6.T/8.T, PA 6.T/9.T, PA 6.T/10T, PA 6.T/12.T, PA 12.T/6.T, PA 6.T/6.I/6, PA 6.T/6.I/12, PA 6.T/6.I/6.10, PA 6.T/6.I/6.12, PA 6.T/6.6, PA 6.T/6.10, PA 6.T/6.12, PA 10.T/6, PA 10.T/11, PA 10.T/12, PA 8.T/6.T, PA 8.T/66, PA 8.T/8.I, PA 8.T/8.6, PA 8.T/6.I, PA 10.T/6.T, PA 10.T/6.6, PA 10.T/10.I, PA 10T/10.1/6.T, PA 10.T/6.I, PA 4.T/4.I/46, PA 4.T/4.I/6.6, PA 5.T/5.I, PA 5.T/5.I/5.6, PA 5.T/5.I/6.6, PA 6.T/6.I/6.6, PA MXDA.6, PA IPDA.I, PA IPDA.T, PA MACM.I, PA MACM.T, PA PACM.I, PA PACM.T, PA MXDA.I, PA MXDA.T, PA 6.T/IPDA.T, PA 6.T/MACM.T, PA 6.T/

PACM.T, PA 6.T/MXDA.T, PA 6.T/6.I/8.T/8.I, PA 6.T/6.I/ 10.T/10.I, PA 6.T/6.I/IPDA.T/IPDA.I, PA 6.T/6.I/MX-DA.T/MXDA.I, PA 6.T/6.I/MACM.T/MACM.I, PA 6.T/6.I/ PACM.T/PACM.I, PA 6.T/10.T/IPDA.T, PA 6.T/12.T/ IPDA.T, PA 6.T/10.T/PACM.T, PA 6.T/12.T/PACM.T, PA 10.T/IPDA.T, PA 12.T/IPDA.T and copolymers and mixtures thereof.

In that case, the polyamide is more preferably selected from PA 6.T, PA 9.T, PA 10.T, PA 12.T, PA 6.I, PA 9.I, PA 10.I, PA 12.I, PA 6.T/6.I, PA 6.T/6, PA6.T/8.T, PA 6.T/10T, PA 10.T/6.T, PA 6.T/12.T, PA12.T/6.T, PA IPDA.I, PA IPDA.T, PA 6.T/IPDA.T, PA 6.T/6.I/IPDA.T/IPDA.I, PA 6.T/10.T/IPDA.T, PA 6.T/12.T/IPDA.T, PA 6.T/10.T/ PACM.T, PA 6.T/12.T/PACM.T, PA 10.T/IPDA.T, PA 12.T/ IPDA.T
and copolymers and mixtures thereof.

In a specific implementation, the semiaromatic polyamide is PA 6.T/6.I.

In a further specific implementation, the semiaromatic polyamide is PA 6.T/6.I/IPDA.T/IPDA.I.

In a further specific implementation, the semiaromatic polyamide is PA 6.T/6.I/MXDA.T/MXDA.I.

For preparation of the prepolymers provided in accordance with the invention, an aqueous composition comprising at least one component suitable for polyamide formation is generally used. The prepolymers can in principle be prepared by customary processes known to those skilled in the art.

A suitable process for preparing semiaromatic polyamide oligomers is described, for example, in EP 0 693 515 A1.

The aqueous composition used for preparation of the prepolymers preferably has a water content of 20 to 55% by weight, more preferably of 25 to 50% by weight, based on the total weight of the composition. In a specific embodiment, an aqueous solution comprising a salt of at least one diamine and at least one carboxylic acid is provided. This solution preferably has a water content of 20 to 55% by weight, more preferably of 25 to 50% by weight, based on the total weight of the solution.

In addition to at least one component suitable for polyamide formation and water, the aqueous composition used for preparation of the prepolymers may comprise further components. These are preferably selected from catalysts, chain transfer agents, application-related additives and mixtures thereof. Suitable additives are flame retardants, inorganic and organic stabilizers, lubricants, dyes, nucleating agents, metallic pigments, metal flakes, metal-coated particles, antistats, conductivity additives, demolding agents, optical brighteners, defoamers, fillers and/or reinforcers, etc.

For preparation of the prepolymers, it is possible to use at least one catalyst. Suitable catalysts are preferably selected from inorganic and/or organic phosphorus, tin or lead compounds, and mixtures thereof.

Examples of tin compounds suitable as catalysts include tin(II) oxide, tin(II) hydroxide, tin(II) salts of mono- or polybasic carboxylic acids, e.g. tin(II) dibenzoate, tin(II) di(2-ethylhexanoate), tin(II) oxalate, dibutyltin oxide, butyltin acid ($C_4H_9$—SnOOH), dibutyltin dilaurate, etc. Suitable lead compounds are, for example, lead(II) oxide, lead(II) hydroxide, lead(II) acetate, basic lead(II) acetate, lead(II) carbonate, etc.

Preferred catalysts are phosphorus compounds such as phosphoric acid, phosphorous acid, hypophosphorous acid, phenylphosphonic acid, phenylphosphinic acid and/or salts thereof with mono- to trivalent cations, for example Na, K, Mg, Ca, Zn or Al and/or esters thereof, for example triphenyl phosphate, triphenyl phosphite or tris(nonylphenyl)phosphite. Particularly preferred catalysts are hypophosphorous acid and salts thereof, such as sodium hypophosphite.

The catalysts are preferably used in an amount of 0.005 to 2.5% by weight, based on the total weight of the aqueous composition.

Particular preference is given to using hypophosphorous acid and/or a salt of hypophosphorous acid in an amount of 50 to 1000 ppm, more preferably of 100 to 500 ppm, based on the total amount of the components suitable for polyamide formation (=components A) to K)).

The ring-opening lactam polymerization can be effected purely hydrolytically without use of a catalyst. In the case of activated anionic lactam polymerization, catalysts which enable the formation of lactam anions are used. Suitable catalysts and activators are known to those skilled in the art. The polycondensation of aminonitriles, for example the preparation of polyamide-6 from 6-aminocapronitrile (ACN), can be performed in the presence of a heterogeneous catalyst, such as $TiO_2$.

For control of the molar mass, it is possible to use at least one chain transfer agent. Suitable chain transfer agents are the monocarboxylic acids A) and monoamines F) mentioned above in the components suitable for polyamide formation. The chain transfer agent is preferably selected from acetic acid, propanoic acid, butyric acid, valeric acid, caproic acid, lauric acid, stearic acid, 2-ethylhexanoic acid, cyclohexanoic acid, benzoic acid, 3-(3,5-di-tert-butyl-4-hydroxyphenyl)propanoic acid, 3,5-di-tert-butyl-4-hydroxybenzoic acid, 3-(3-tert-butyl-4-hydroxy-5-methylphenyl)propanoic acid, 2-(3,5-di-tert-butyl-4-hydroxybenzylthio)acetic acid, 3,3-bis(3-tert-butyl-4-hydroxyphenyl)butanoic acid, butylamine, pentylamine, hexylamine, 2-ethylhexylamine, n-octylamine, n-dodecylamine, n-tetradecylamine, n-hexadecylamine, stearylamine, cyclohexylamine, 3-(cyclohexylamino)propylamine, methylcyclohexylamine, dimethylcyclohexylamine, benzylamine, 2-phenylethylamine, 2,2,6,6-tetramethylpiperidin-4-amine, 1,2,2,6,6-pentamethylpiperidin-4-amine, 4-amino-2,6-di-tert-butylphenol and mixtures thereof. It is also possible to use other monofunctional compounds which can react with an amino or acid group as the transfer agent, such as anhydrides, isocyanates, acid halides or esters. The customary use amount of the chain transfer agents is within a range from 5 to 500 mmol per kg of polyamide oligomer, preferably 10 to 200 mmol per kg of prepolymer.

If desired, further additives other than catalysts and chain transfer agents can be added to the aqueous composition. The additives include, for example, antioxidants, light stabilizers, standard processing aids, nucleating agents and crystallization accelerators.

The prepolymers provided preferably have a number-average molecular weight $M_n$ of about 500 to about 12000 g/mol, preferably of about 1000 to 4000 g/mol.

The prepolymer provided in step a) can be provided in a particle size ranging from pulverulent particles to granule size. Preferably, the prepolymer provided in step a) has a particle size within a range from 1 μm to 10 mm. A preferred embodiment is a powder having a particle size within a range from 100 μm to 1 mm.

Preferably, the prepolymer is subjected to shaping before being used in step b). Preferably, the shaping of the prepolymer comprises a pelletization and/or grinding operation. Suitable processes for pelletization and grinding of polyamides are known to those skilled in the art. Suitable processes are described, for example, in Kunststoffhandbuch, 3/4 Technische Thermoplaste: Polyamide, Carl Hanser Verlag, 1998, Munich, p. 68-69. A specific shaping process is underwater pelletization, which is likewise known in principle to those skilled in the art. In a suitable implementation, the polyamide is first shaped to one or more strands for shaping. For this purpose, apparatuses known to those skilled in the art can be used. Suitable apparatuses are, for example, perforated plates, nozzles or die plates. The strand diameter is preferably within a range from 0.5 mm to 20 mm, more preferably 1 mm to 5 mm, most preferably 1.5 to 3 mm. In a suitable embodiment, the polyamide which has been shaped to strands is subjected in free-flowing form to a comminution to give polyamide particles. In an alternative embodiment, the polyamide which has been shaped to strands is solidified and then subjected to a comminution to give polyamide particles. Suitable mills for grinding the prepolymers are, for example, hammer mills, roll mills, ball mills, etc.

In step b) of the process according to the invention, the prepolymer provided in step a) is subjected to a solid state polymerization in a closed vessel at elevated temperature and elevated pressure in the presence of a gas which is inert under the treatment conditions.

Closed vessels suitable for the solid state polymerization are the pressure vessels (autoclaves) which can be sealed gas-tight and are known to those skilled in the art, as typically used for the thermal treatment of substances in the elevated pressure range.

In the solid state polymerization in step b), the temperature in the closed vessel is preferably within a range from 200 to 290° C., more preferably from 250 to 280° C.

In the solid state polymerization in step b), the pressure in the closed vessel is preferably within a range from 1.5 to 20 bar, more preferably from 2 to 15 bar, especially from 3 to 10 bar. An especially suitable pressure range is from 4 to 7 bar.

The residence time in step b) in the closed vessel is preferably 0.5 hour to 72 hours, more preferably 1 hour to 48 hours, especially 2 to 24 hours.

Suitable inert gases are, for example, nitrogen, $CO_2$, helium, neon and argon, and mixtures thereof. Preference is given to using nitrogen.

The process according to the invention leads to semiaromatic polyamides having particularly advantageous properties.

The figures for the number-average molecular weight $M_n$ and for the weight-average molecular weight $M_w$ in the context of this invention are each based on a determination by means of gel permeation chromatography (GPC). For calibration, PMMA was used as a polymer standard with low polydispersity.

The inventive aliphatic polyamides, and those obtained by the process according to the invention, preferably have a number-average molecular weight $M_n$ within a range from 13 000 to 28 000 g/mol.

The inventive semiaromatic polyamides, and those obtained by the process according to the invention, preferably have a number-average molecular weight $M_n$ within a range from 13 000 to 25 000 g/mol, more preferably from 15 000 to 20 000 g/mol.

The inventive aliphatic polyamides, and those obtained by the process according to the invention, preferably have a weight-average molecular weight $M_w$ within a range from 20 000 to 140 000 g/mol.

The inventive semiaromatic polyamides, and those obtained by the process according to the invention, preferably have a weight-average molecular weight $M_w$ within a range from 25 000 to 125 000 g/mol.

The inventive aliphatic and semiaromatic polyamides, and those obtained by the process according to the invention, preferably have a polydispersity PD ($=M_w/M_n$) not exceeding 6, more preferably not exceeding 5, especially not exceeding 3.5.

The aliphatic polyamides obtainable by the process according to the invention are especially suitable for production of films, monofilaments, fibers, yarns or textile fabrics. In this context, the aliphatic polyamides prepared in accordance with the invention are generally found to be particularly stable to processing during a melt extrusion through slot dies or annular dies to form flat or blown films, and through annular dies of smaller diameter to form monofilaments.

The semiaromatic polyamides obtainable by the process according to the invention likewise have advantageous properties.

The inventive semiaromatic polyamide, and that obtained by the process according to the invention, preferably has a gel content not exceeding 5% by weight, based on the total weight of the polyamide.

The inventive semiaromatic polyamide, and that obtained by the process according to the invention, preferably has a viscosity number of 80 to 120 ml/g. The viscosity number (Staudinger function, referred to as VN or J) is defined as $VN=1/c \times (\eta - \eta_s)/\eta_s$. The viscosity number is directly related to the mean molar mass of the polyamide and gives information about the processability of a polymer. The viscosity number can be determined to EN ISO 307 with an Ubbelohde viscometer.

Polyamide Molding Composition

The invention further provides a polyamide molding composition comprising at least one inventive semiaromatic copolyamide.

Preference is given to a polyamide molding composition comprising:

A) 25 to 100% by weight of at least one semiaromatic copolyamide, as defined above,
B) 0 to 75% by weight of at least one filler and reinforcer,
C) 0 to 50% by weight of at least one additive,
where components A) to C) together add up to 100% by weight.

The term "filler and reinforcer" (=component B) is understood in a broad sense in the context of the invention and comprises particulate fillers, fibrous substances and any intermediate forms. Particulate fillers may have a wide range of particle sizes ranging from particles in the form of dusts to large grains. Useful filler materials include organic or inorganic fillers and reinforcers. For example, it is possible to use inorganic fillers, such as kaolin, chalk, wollastonite, talc, calcium carbonate, silicates, titanium dioxide, zinc oxide, graphite, glass particles, e.g. glass beads, nanoscale fillers, such as carbon nanotubes, carbon black, nanoscale sheet silicates, nanoscale alumina ($Al_2O_3$), nanoscale titania ($TiO_2$), graphene, permanently magnetic or magnetizable metal compounds and/or alloys, sheet silicates and nanoscale silica ($SiO_2$). The fillers may also have been surface treated.

Examples of sheet silicates used in the inventive molding compositions include kaolins, serpentines, talc, mica, vermiculites, illites, smectites, montmorillonite, hectorite, double hydroxides or mixtures thereof. The sheet silicates may have been surface treated or may be untreated.

In addition, it is possible to use one or more fibrous substances. These are preferably selected from known inorganic reinforcing fibers, such as boron fibers, glass fibers, carbon fibers, silica fibers, ceramic fibers and basalt fibers;

organic reinforcing fibers, such as Aramid fibers, polyester fibers, nylon fibers, polyethylene fibers and natural fibers, such as wood fibers, flax fibers, hemp fibers and sisal fibers.

It is especially preferable to use glass fibers, carbon fibers, Aramid fibers, boron fibers, metal fibers or potassium titanate fibers.

Specifically, chopped glass fibers are used. More particularly, component B) comprises glass fibers and/or carbon fibers, preference being given to using short fibers. These preferably have a length in the range from 2 to 50 mm and a diameter of 5 to 40 μm. Alternatively, it is possible to use continuous fibers (rovings). Suitable fibers are those having a circular and/or noncircular cross-sectional area, in which latter case the ratio of dimensions of the main cross-sectional axis to the secondary cross-sectional axis is especially >2, preferably in the range from 2 to 8 and more preferably in the range from 3 to 5.

In a specific implementation, component B) comprises what are called "flat glass fibers". These specifically have a cross-sectional area which is oval or elliptical or elliptical and provided with indentation(s) (called "cocoon" fibers) or rectangular or virtually rectangular. Preference is given here to using glass fibers with a noncircular cross-sectional area and a ratio of dimensions of the main cross-sectional axis to the secondary cross-sectional axis of more than 2, preferably of 2 to 8, especially of 3 to 5.

For reinforcement of the inventive molding compositions, it is also possible to use mixtures of glass fibers having circular and noncircular cross sections. In a specific implementation, the proportion of flat glass fibers, as defined above, predominates, meaning that they account for more than 50% by weight of the total mass of the fibers.

If rovings of glass fibers are used as component B), these preferably have a diameter of 10 to 20 μm, preferably of 12 to 18 μm. In this case, the cross section of the glass fibers may be round, oval, elliptical, virtually rectangular or rectangular. Particular preference is given to what are called flat glass fibers having a ratio of the cross-sectional axes of 2 to 5. More particularly, E glass fibers are used. However, it is also possible to use all other glass fiber types, for example A, C, D, M, S or R glass fibers or any desired mixtures thereof, or mixtures with E glass fibers.

The inventive polyamide molding compositions can be produced by the known processes for producing long fiber-reinforced rod pellets, especially by pultrusion processes, in which the continuous fiber strand (roving) is fully saturated with the polymer melt and then cooled and cut. The long fiber-reinforced rod pellets obtained in this manner, which preferably have a pellet length of 3 to 25 mm, especially of 4 to 12 mm, can be processed by the customary processing methods, for example injection molding or press molding, to give moldings.

The inventive polyamide molding composition comprises preferably 25 to 75% by weight, more preferably 33 to 60% by weight, of at least one filler or reinforcer B), based on the total weight of the polyamide molding composition.

Suitable additives C) are heat stabilizers, flame retardants, light stabilizers (UV stabilizers, UV absorbers or UV blockers), lubricants, dyes, nucleating agents, metallic pigments, metal flakes, metal-coated particles, antistats, conductivity additives, demolding agents, optical brighteners, defoamers, etc.

As component C), the inventive molding compositions comprise preferably 0.01 to 3% by weight, more preferably 0.02 to 2% by weight and especially 0.1 to 1.5% by weight of at least one heat stabilizer.

The heat stabilizers are preferably selected from copper compounds, secondary aromatic amines, sterically hindered phenols, phosphites, phosphonites and mixtures thereof.

If a copper compound is used, the amount of copper is preferably 0.003 to 0.5%, especially 0.005 to 0.3% and more preferably 0.01 to 0.2% by weight, based on the sum of components A) to C).

If stabilizers based on secondary aromatic amines are used, the amount of these stabilizers is preferably 0.2 to 2% by weight, more preferably from 0.2 to 1.5% by weight, based on the sum of components A) to C).

If stabilizers based on sterically hindered phenols are used, the amount of these stabilizers is preferably 0.1 to 1.5% by weight, more preferably from 0.2 to 1% by weight, based on the sum of components A) to C).

If stabilizers based on phosphites and/or phosphonites are used, the amount of these stabilizers is preferably 0.1 to 1.5% by weight, more preferably from 0.2 to 1% by weight, based on the sum of components A) to C).

Suitable compounds C) of mono- or divalent copper are, for example, salts of mono- or divalent copper with inorganic or organic acids or mono- or dihydric phenols, the oxides of mono- or divalent copper or the complexes of copper salts with ammonia, amines, amides, lactams, cyanides or phosphines, preferably Cu(I) or Cu(II) salts of the hydrohalic acids or of the hydrocyanic acids or the copper salts of the aliphatic carboxylic acids. Particular preference is given to the monovalent copper compounds CuCl, CuBr, CuI, CuCN and $Cu_2O$, and to the divalent copper compounds $CuCl_2$, $CuSO_4$, CuO, copper(II) acetate or copper(II) stearate.

The copper compounds are commercially available, or the preparation thereof is known to those skilled in the art. The copper compound can be used as such or in the form of concentrates. A concentrate is understood to mean a polymer, preferably of the same chemical nature as component A), which comprises the copper salt in high concentration. The use of concentrates is a standard method and is employed particularly frequently when very small amounts of a feedstock have to be metered in. Advantageously, the copper compounds are used in combination with further metal halides, especially alkali metal halides, such as NaI, KI, NaBr, KBr, in which case the molar ratio of metal halide to copper halide is 0.5 to 20, preferably 1 to 10 and more preferably 3 to 7.

Particularly preferred examples of stabilizers which are based on secondary aromatic amines and are usable in accordance with the invention are adducts of phenylenediamine with acetone (Naugard A), adducts of phenylenediamine with linolenic acid, 4,4'-bis(α,α-dimethylbenzyl)diphenylamine (Naugard® 445), N,N'-dinaphthyl-p-phenylenediamine, N-phenyl-N'-cyclohexyl-p-phenylenediamine or mixtures of two or more thereof.

Preferred examples of stabilizers which are based on sterically hindered phenols and are usable in accordance with the invention are N,N'-hexamethylenebis-3-(3,5-di-tert-butyl-4-hydroxyphenyl)propionamide, bis(3,3-bis(4'-hydroxy-3'-tert-butylphenyl)butanoic acid) glycol ester, 2,1'-thioethyl bis(3-(3,5-di-tert-butyl-4-hydroxyphenyl)propionate, 4,4'-butylidenebis(3-methyl-6-tert-butylphenol), triethylene glycol 3-(3-tert-butyl-4-hydroxy-5-methylphenyl)propionate or mixtures of two or more of these stabilizers.

Preferred phosphites and phosphonites are triphenyl phosphite, diphenyl alkyl phosphite, phenyl dialkyl phosphite, tris(nonylphenyl)phosphite, trilauryl phosphite, trioctadecyl phosphite, distearyl pentaerythrityl diphosphite, tris(2,4-ditert-butylphenyl)phosphite, diisodecyl pentaerythrityl diphosphite, bis(2,4-di-tert-butylphenyl)pentaerythrityl diphosphite, bis(2,6-di-tert-butyl-4-methylphenyl)pentaerythrityl diphosphite, diisodecyloxy pentaerythrityl diphosphite, bis(2,4-di-tert-butyl-6-methylphenyl)pentaerythrityl diphosphite, bis(2,4,6-tris(tert-butylphenyl)) pentaerythrityl diphosphite, tristearylsorbitol triphosphite, tetrakis(2,4-di-tert-butylphenyl)-4,4'-biphenylene diphosphonite, 6-isooctyloxy-2,4,8,10-tetra-tert-butyl-12H-dibenzo-[d,g]-1,3,2-dioxaphosphocin, 6-fluoro-2,4,8,10-tetra-tert-butyl-12-methyldibenzo-[d,g]-1,3,2-dioxaphosphocin, bis(2,4-di-tert-butyl-6-methylphenyl) methyl phosphite and bis(2,4-di-tert-butyl-6-methylphenyl) ethyl phosphite. More particularly, preference is given to tris[2-tert-butyl-4-thio(2'-methyl-4'-hydroxy-5'-tert-butyl) phenyl-5-methyl]phenyl phosphite and tris(2,4-di-tert-butylphenyl)phosphite (Hostanox® PAR24: commercial product from BASF SE).

A preferred embodiment of the heat stabilizer consists in the combination of organic heat stabilizers (especially Hostanox PAR 24 and Irganox 1010), a bisphenol A-based epoxide (especially Epikote 1001) and copper stabilization based on CuI and KI. An example of a commercially available stabilizer mixture consisting of organic stabilizers and epoxides is Irgatec NC66 from BASF SE. More particularly, preference is given to heat stabilization exclusively based on CuI and KI. Aside from the use of copper or copper compounds, the use of further transition metal compounds, especially metal salts or metal oxides of group VB, VIB, VIIB or VIIIB of the Periodic Table, is ruled out. In addition, it is preferable not to add any transition metals of group VB, VIB, VIIB or VIIIB of the Periodic Table, for example iron powder or steel powder, to the inventive molding composition.

The inventive molding compositions comprise preferably 0 to 30% by weight, more preferably 0 to 20% by weight, based on the total weight of components A) to C), of at least one flame retardant as additive C). When the inventive molding compositions comprise at least one flame retardant, they preferably do so in an amount of 0.01 to 30% by weight, more preferably of 0.1 to 20% by weight, based on the total weight of components A) to C). Useful flame retardants C) include halogenated and halogen-free flame retardants and synergists thereof (see also Gächter/Müller, 3rd edition 1989 Hanser Verlag, chapter 11). Preferred halogen-free flame retardants are red phosphorus, phosphinic or diphosphinic salts and/or nitrogen-containing flame retardants such as melamine, melamine cyanurate, melamine sulfate, melamine borate, melamine oxalate, melamine phosphate (primary, secondary) or secondary melamine pyrophosphate, neopentyl glycol boric acid melamine, guanidine and derivatives thereof known to those skilled in the art, and also polymeric melamine phosphate (CAS No.: 56386-64-2 or 218768-84-4, and also EP 1095030), ammonium polyphosphate, trishydroxyethyl isocyanurate (optionally also ammonium polyphosphate in a mixture with trishydroxyethyl isocyanurate) (EP 584567). Further N-containing or P-containing flame retardants, or PN condensates suitable as flame retardants, can be found in DE 10 2004 049 342, as can the synergists likewise customary for this purpose, such as oxides or borates. Suitable halogenated flame retardants are, for example, oligomeric brominated polycarbonates (BC 52 Great Lakes) or polypentabromobenzyl acrylates with N greater than 4 (FR 1025 Dead sea bromine), reaction products of tetrabromobisphenol A with epoxides, brominated oligomeric or polymeric styrenes, Dechlorane, which are usually used with antimony oxides as synergists (for details and further flame retardants see DE-A-10 2004 050 025).

The antistats used in the inventive molding compositions may, for example, be carbon black and/or carbon nanotubes. The use of carbon black may also serve to improve the black color of the molding composition. However, the molding composition may also be free of metallic pigments.

Molding

The present invention further relates to moldings which are produced using the inventive copolyamides or polyamide molding compositions.

The inventive semiaromatic polyamides are advantageously suitable for use for production of moldings for electrical and electronic components and for high-temperature automotive applications.

A specific embodiment is moldings in the form of or as part of a component for the automotive sector, especially selected from cylinder head covers, engine hoods, housings for charge air coolers, charge air cooler valves, intake pipes, intake manifolds, connectors, gears, fan impellers, cooling water tanks, housings or housing parts for heat exchangers, coolant coolers, charge air coolers, thermostats, water pumps, heating elements, securing parts.

A further specific embodiment is moldings as or as part of an electrical or electronic passive or active component of a printed circuit board, of part of a printed circuit board, of a housing constituent, of a film, or of a wire, more particularly in the form of or as part of a switch, of a plug, of a bushing, of a distributor, of a relay, of a resistor, of a capacitor, of a winding or of a winding body, of a lamp, of a diode, of an LED, of a transistor, of a connector, of a regulator, of an integrated circuit (IC), of a processor, of a controller, of a memory element and/or of a sensor.

The inventive semiaromatic polyamides are additionally specifically suitable for use in soldering operations under lead-free conditions (lead free soldering), for production of plug connectors, microswitches, microbuttons and semiconductor components, especially reflector housings of light-emitting diodes (LEDs).

A specific embodiment is that of moldings as securing elements for electrical or electronic components, such as spacers, bolts, fillets, push-in guides, screws and nuts.

Especially preferred is a molding in the form of or as part of a socket, of a plug connector, of a plug or of a bushing. The molding preferably includes functional elements which require mechanical toughness. Examples of such functional elements are film hinges, snap-in hooks and spring tongues.

Possible uses in automobile interiors are for dashboards, steering-column switches, seat components, headrests, center consoles, gearbox components and door modules, and possible uses in automobile exteriors are for door handles, exterior mirror components, windshield wiper components, windshield wiper protective housings, grilles, roof rails, sunroof frames, engine covers, cylinder head covers, intake pipes, windshield wipers, and exterior bodywork parts.

Possible uses of polyamides with improved flow for the kitchen and household sector are the production of components for kitchen machines, for example fryers, smoothing irons, knobs, and also applications in the garden and leisure sector, for example components for irrigation systems or garden equipment and door handles.

The examples which follow serve to illustrate the invention, but without restricting it in any way.

EXAMPLES

Analytical Methods

Molecular weight determination by means of GPC:
Standard: PMMA
Eluent: hexafluoroisopropanol+0.05% potassium trifluoroacetate
Flow rate: 1 ml/min
Column pressure: precolumn 7.5 MPa, separation columns 75 MPa
Column set: 1 precolumn (I=5 cm), 2 separation columns (I=30 cm each)
Detector: DRI (refractive index detector) Agilent 1100

The gel content of the polymer was determined indirectly by GPC. For this purpose, samples of the polyamide were dissolved in hexafluoroisopropanol+0.05% potassium trifluoroacetate and filtered through a filter (Millipore Millex FG) having a pore size of 0.2 μm. Subsequently, the concentration of the polymer which is eluted from the GPC was determined. The gel content is calculated from the difference of the theoretical polymer concentration given by the amount of polymer used prior to the filtration from the measured concentration (based on polymer used prior to the filtration).

The prepolymers were prepared as described in EP 0 693 515 A1, examples 9.1-9.3.

TABLE 1

Semiaromatic polyamide prepolymers used

| Prepolymer No. | Composition | Mn [g/mol] | Mw [g/mol] | PD | Gel [%] | Appearance |
|---|---|---|---|---|---|---|
| 1 | PA 6.T/6.I/MXDA.T/MXDA.I | 1300 | 2600 | 2.0 | <5 | white powder |
| 2 | PA 6.T/6.I/MXDA.T/MXDA.I | 1500 | 3000 | 2.0 | <5 | white powder |
| 3 | PA 6.T/6.I | 3800 | 8000 | 2.1 | <5 | white powder |
| 4 | PA 6.T/6.I | 1800 | 3500 | 1.9 | <5 | white powder |

TABLE 2

Inventive examples

| Example No. | Prepolymer No. | Mn [g/mol] | Mw [g/mol] | PD | Gel [%] | Appearance | T [° C.] | t [min] | Atmosphere |
|---|---|---|---|---|---|---|---|---|---|
| 1 | 1 | 21000 | 68500 | 3.3 | <5 | white powder | 280 | 360 | $N_2$, 5 bar |
| 2 | 1 | 21000 | 61400 | 2.9 | <5 | white powder | 280 | 360 | $N_2$, 5 bar |
| 3 | 1 | 20400 | 59500 | 2.9 | <5 | white powder | 280 | 360 | $N_2$, 5 bar |
| 4 | 1 | 217000 | 82200 | 3.8 | <5 | white powder | 280 | 360 | $N_2$, 5 bar |

Method: Solid state condensation, unstirred autoclave, 10 g of polymer in test tube

TABLE 3

Inventive examples

| Example No. | Prepolymer No. | Mn [g/mol] | Mw [g/mol] | PD | Gel [%] | Appearance | T [° C.] | t [min] | Atmosphere |
|---|---|---|---|---|---|---|---|---|---|
| 5 | 3 | 17500 | 42800 | 2.4 | <5 | white powder | 280 | 360 | $N_2$, 1 bar |
| 6 | 3 | 17000 | 37700 | 2.2 | <5 | white powder | 280 | 360 | $N_2$, 5 bar |
| 7 | 3 | 16500 | 35500 | 2.2 | <5 | white powder | 280 | 360 | $N_2$, 5 bar |
| 8 | 3 | 188000 | 48800 | 2.6 | <5 | white powder | 280 | 360 | $N_2$, 5 bar |

Method: Solid state condensation, unstirred autoclave, 10 g of polymer in test tube

TABLE 4

Inventive examples

| Example No. | Prepolymer No. | Mn [g/mol] | Mw [g/mol] | PD | Gel [%] | Appearance | T [° C.] | t [min] | Atmosphere |
|---|---|---|---|---|---|---|---|---|---|
| 9 | 4 | 15500 | 43700 | 2.8 | <5 | white powder | 280 | 360 | $N_2$, 5 bar |
| 10 | 4 | 15700 | 49000 | 3.1 | <5 | white powder | 280 | 360 | $N_2$, 5 bar |
| 11 | 4 | 15400 | 47100 | 3.1 | <5 | white powder | 280 | 360 | $N_2$, 5 bar |

TABLE 4-continued

Inventive examples

| Example No. | Prepolymer No. | Mn [g/mol] | Mw [g/mol] | PD | Gel [%] | Appearance | T [° C.] | t [min] | Atmosphere |
|---|---|---|---|---|---|---|---|---|---|
| 12 | 4 | 15600 | 49300 | 3.2 | <5 | white powder | 280 | 360 | N$_2$, 5 bar |

Method: Solid state condensation, unstirred autoclave, 10 g of polymer in test tube

TABLE 5

Comparative examples

| Example No. | Prepolymer No. | Mn [g/mol] | Mw [g/mol] | PD | Gel [%] | Appearance | T [° C.] | t [min] | Atmosphere |
|---|---|---|---|---|---|---|---|---|---|
| C1 | 1 | 5540 | 31500 | 5.7 | 70 | pale yellow powder | 280 | 360 | N$_2$ stream |
| C2 | 3 | 5830 | 31900 | 5.5 | 85 | white powder | 280 | 360 | N$_2$ stream |
| C3 | 4 | 18900 | 124000 | 6.6 | 45 | white powder | 280 | 360 | N$_2$ stream |

Method: solid phase condensation, unstirred autoclave, 10 g of polymer in a test tube. The temperature control was conducted under the same conditions as in the inventive examples, except with a constant nitrogen flow (20 L/h) rather than a pressure of 5. It can be seen that the PD is much higher than in the inventive examples and the material has a high gel content.

The invention claimed is:

1. A process for preparing an aliphatic or semiaromatic polyamide comprising
   a) providing a prepolymer of the aliphatic or semiaromatic polyamide,
   b) subjecting the prepolymer provided in step a) to a solid state polymerization in a closed vessel at a temperature within a range from 200 to 290° C. and a pressure within a range from 1.5 to 20 bar in the presence of a gas which is inert under the treatment conditions.

2. The process according to claim 1, wherein the prepolymer provided in step a) comprises polymerized components selected from the group consisting of
   A) unsubstituted or substituted aromatic dicarboxylic acids and derivatives of unsubstituted or substituted aromatic dicarboxylic acids,
   B) unsubstituted or substituted aromatic diamines,
   C) aliphatic or cycloaliphatic dicarboxylic acids and derivatives thereof,
   D) aliphatic or cycloaliphatic diamines,
   E) monocarboxylic acids and derivatives thereof,
   F) monoamines,
   G) at least trifunctional amines,
   H) lactams,
   I) ω-amino acids, and
   K) compounds different from A) to I) and that are cocondensable therewith.

3. The process according to claim 2, wherein at least one of components A) and B) is present for providing the prepolymer in step a).

4. The process according to claim 1, wherein the polyamide is selected from the group consisting of PA 6.T, PA 9.T, PA8.T, PA 10.T, PA 12.T, PA 6.I, PA 8I, PA 9I, PA 10I, PA 12I, PA 6.T/6, PA 6.T/10, PA 6.T/12, PA 6.T/6I, PA6.T/8.T, PA 6.T/9.T, PA 6.T/10T, PA 6.T/12.T, PA 12.T/6.T, PA 6.T/6.1/6, PA 6.T/6.I/12, PA 6.T/6.I/6.10, PA 6.T/6.I/6.12, PA 6.T/6.6, PA 6.T/6.10, PA 6.T/6.12, PA 10.T/6, PA 10.T/11, PA 10.T/12, PA 8.T/6.T, PA 8.T/66, PA 8.T/8.I, PA 8.T/8.6, PA 8.T/6.I, PA 10.T/6.T, PA 10.T/6.6, PA 10.T/10I, PA 10T/10.I/6.T, PA 10.T/6I, PA 4.T/4.I/46, PA 4.T/4.I/6.6, PA 5.T/5.I, PA 5.T/5.I/5.6, PA 5.T/5.I/6.6, PA 6.T/6.I/6.6, PA MXDA.6, PA IPDA.I, PA IPDA.T, PA MACM.I, PA MACM.T, PA PACM.I, PA PACM.T, PA MXDA.I, PA MXDA.T, PA 6.T/IPDA.T, PA 6.T/MACM.T, PA 6.T/PACM.T, PA 6.T/MXDA.T, PA 6.T/6.I/8.T/8.I, PA 6.T/6.I/10.T/10I, PA 6.T/6.I/IPDA.T/IPDA.I, PA 6.T/6.I/MXDA.T/MXDA.I, PA 6.T/6.I/MACM.T/MACM.I, PA 6.T/6.I/PACM.T/PACM.I, PA 6.T/10.T/IPDA.T, PA 6.T/12.T/IPDA.T, PA 6.T/10.T/PACM.T, PA 6.T/12.T/PACM.T, PA 10.T/IPDA.T, PA 12.T/IPDA.T, and copolymers and mixtures thereof.

5. The process according to claim 1, wherein the prepolymer of step a) is PA 6.T/6.I or PA 6.T/6.I/IPDA.T/IPDA.I or PA 6.T/6.I/MXDA.T/MXDA.I.

6. The process according claim 1, wherein the prepolymer of step a) has a number-average molecular weight of 500 to about 12,000 g/mol.

7. The process according to claim 6, wherein the prepolymer of step a) has a number-average molecular weight of about 1000 to 4000 g/mol.

8. The process according to claim 1, wherein the temperature in the closed vessel in the solid state polymerization in step b) is within a range from 250 to 280° C.

9. The process according to claim 1, wherein the pressure in the closed vessel in the solid state polymerization in step b) is within a range from 2 to 15 bar.

10. The process according to claim 9, wherein the pressure in the closed vessel in the solid state polymerization in step b) is within a range from 3 to 10 bar.

11. The process according to claim 1, wherein the inert gas used in the solid state polymerization in step b) is nitrogen.

12. The process according to claim 1, wherein the gas which is inert consists of an inert gas selected from the group consisting of nitrogen, carbon dioxide, helium, argon, neon, and mixtures thereof.

13. The process according to claim 1, wherein there is no discharge of water from the closed vessel interior during the solid state polymerization.

14. The process according to claim 1, wherein no gas stream is passed through the closed vessel during the solid state polymerization.

* * * * *